(12) United States Patent
Betts

(10) Patent No.: US 7,930,279 B2
(45) Date of Patent: Apr. 19, 2011

(54) SYSTEMS AND METHODS ADAPTED TO RETRIEVE AND/OR SHARE INFORMATION VIA INTERNET COMMUNICATIONS

(75) Inventor: Christopher Betts, Mt. Dandenong (AU)

(73) Assignee: Christopher Betts, Mt. Dandenong (AU)

( * ) Notice: Subject to any disclaimer, the term of this patent is extended or adjusted under 35 U.S.C. 154(b) by 288 days.

(21) Appl. No.: 11/864,874

(22) Filed: Sep. 28, 2007

(65) Prior Publication Data

US 2008/0082548 A1 Apr. 3, 2008

(30) Foreign Application Priority Data

Sep. 29, 2006 (AU) .................................. 2006905387

(51) Int. Cl.
*G06F 17/30* (2006.01)

(52) U.S. Cl. .......................... 707/705; 707/791; 707/802
(58) Field of Classification Search .................. 707/705, 707/754, 769, 781, 791, 802; 379/67.1, 202.01
See application file for complete search history.

(56) References Cited

OTHER PUBLICATIONS

Adina Levin, "Chapter 14: Campaign Tools", Oct. 28, 2004, pp. 1-26.*
Mun et al. An Automatic Rating Technique Based on XML Docuement, AH 2002, LNCS 2347, pp. 424-427.*

* cited by examiner

*Primary Examiner* — Fred I Ehichioya
(74) *Attorney, Agent, or Firm* — Greenblum & Bernstein, PLC

(57) ABSTRACT

The present invention relates to systems and methods of retrieving and/or sharing information via internet communications. In one form, the invention relates to searching, filtering and/or disseminating information between users.

38 Claims, 8 Drawing Sheets

SYSTEMS AND METHODS ADAPTED TO RETRIEVE AND/OR SHARE INFORMATION VIA INTERNET COMMUNICATIONS

FIELD OF INVENTION

The present invention relates to systems and methods of retrieving and/or sharing information via internet communications. In one form, the invention relates to searching, filtering, and/or disseminating information between users. It will be convenient to hereinafter describe the invention in relation to this function, however it should be appreciated that the present invention is not limited to that use only.

BACKGROUND OF THE INVENTION

The discussion throughout this specification comes about due to the realization of the inventor(s) and/or the identification of certain prior art problems by the inventor(s). Significant work has been done on making computer "bulletin boards" (or, more recently, "web forums") more useful by allowing user ratings and threaded conversations. Rated web sites (e.g., slashdot.org, digg.com) allow users to rate comments and articles. However they are not "social networking" web sites; users cannot organise and structure the material on those sites and the "top level" topics are a flat list. Further, the material is public, so users cannot have private or small-group based conversations, and cannot customise or extend the system to be a personal web space.

Numerous "social networking" sites exist, that allow normal users to access the world wide web in ways that only technically literate users were previously able to do. People are able to post web diaries, photos, calendars, encyclopaedia entries and comment on the postings of other users using services (circa 2006) such as Flickr™, Google Blog.'™, Wikipedia™, and MySpace™. In addition, older but similar technologies such as archived mailing lists and discussion forums allow people to have on-line conversations that are preserved and may be viewed and searched at a later date.

All these services suffer from a number of short comings, including without limitation that finding specific information can be laborious due to difficulties of categorisation, there are large quantities of poor quality or irrelevant information and the inability to easily share and search sensitive information. Thus for a user, in using these prior art technologies, there are difficulties, such as: finding relevant information; excluding irrelevant information; modifying inaccurate information; classifying information (in a taxonomic hierarchy); rating information (as useful, or funny, or child safe, or whatever). For example, it is difficult to answer the following questions without working through a lot of "false positives": show me the most interesting web logs involving poodles in the last 24 hours; show me a summary of the most important emails sent by the marketing department this week; summarize Australian news today, especially mining and resource businesses and ignoring sports other than rugby; summarize the last year's worth of meeting notes for the legal department. In addition, many security related tasks are very difficult for the average user to perform on the open web. For example: share multiple documents securely between multiple parties; show personal photos to my family only; send an email to a recruiter from the office without it being scanned by the corporate mail filter; cast an anonymous vote on a web forum.

It has been realized by the inventor(s) that these problems are caused by existing systems being relational (i.e., a flat network of arbitrarily connected nodes), usually unrated, difficult to summarize, and often insecure. Any discussion of documents, devices, acts, or knowledge in this specification is included to explain the context of the invention. It should not be taken as an admission that any of the material forms a part of the prior art base or the common general knowledge in the relevant art in Australia or elsewhere on or before the priority date of the disclosure and claims herein.

One aspect of the present invention is to alleviate problems associated with retrieving and/or sharing information via internet communications. A further aspect of the present invention is to alleviate at least one disadvantage associated with the prior art.

SUMMARY OF INVENTION

The present invention provides, in accordance with one aspect of invention, a method of and/or apparatus and/or system for arranging information in a communication system, comprising providing the information in a hierarchical format, and providing a rating to at least a portion of the hierarchical formatted information.

The present invention provides, in accordance with another aspect of invention, information and/or a device adapted to store information arranged in accordance with method as disclosed herein.

Other aspects and preferred aspects are disclosed in the specification and/or defined in the appended claims, forming a part of the description of the invention.

In essence, the present invention is based on the idea of an evolving hierarchy of user supplied news, blogs, photos, and other information items. These items are rated by users, and summarized for display, allowing users to filter the items they view. The items a user submits to the present invention may be selectively public, completely private, or restricted to a group of designated users.

The inventors realize that systems that allow 'plug-ins' to view data are relatively common. Code plug-ins are used in some wikis, such as the 'Confluence' wiki by Atlassian software. The current invention extends this to a hierarchical social networking site, allowing users to customize the view of different 'node types' that correspond to a different 'mini application' that appears in the users personal web space. The usage is similar to that in the 'Facebook' social networking site, however unlike 'Facebook' the data and processing is done on the main server (rather than requiring a separate computer system to do the work, as with 'Facebook'), and the data is secured in same fashion as other data, allowing the system to be used for commercial and sensitive purposes.

Furthermore, the inventors realize that web views of hierarchical databases have been used in the database industry for some time, for example Computer Associate's 'JXWeb' utility (circa 2003) and IBM also has such a system. These systems view raw LDAP or X500 data however, they provide limited formatting, and are designed for computer operators to view the underlying data in a database. The current invention uses a similar system for the raw access of hierarchical data, but extends it with a rich GUI that allows non-technical users to create and browse data, add security rules, interact with friends and so forth, while remaining largely ignorant of the underlying data store.

The inventors also realize that although some web sites with 'secure areas' are known, however these are 'secure areas' usually set up by the web site owners for the use of paying subscribers. Systems that allow ordinary users to create a private web space for the use of themselves and friends are less common; however they do exist. The current invention extends the usability of such systems by allowing users to set and refine (for example by Voting, Round trip email, SSL)

security rules on hierarchical trees of data. Thus, whereas an existing system might allow a user to create a private 'gallery of images' to share with friends, the current invention allows a user to create an overall 'private gallery' area for the use of family members, and then create sub-gallery areas that limit the viewing still further, or add particular individuals to the viewing list without affecting the security privileges of other private areas.

The inventors have further realized that voting on the web is known in the form of public polls, and specialist voting sites (such as 'friendherder.com' circa 2006) exist to allow an arbitrary group of people to be polled on arbitrary topics. However the current invention allows for private votes to be taken in private areas, potentially anonymously, automatically using the list of secure users that have already been granted access to a particular secure area in the data hierarchy. This makes voting convenient and less effort than setting up a voting list, and works well with the overall 'social networking' aspect of the current invention.

In addition it is considered that the 'bubbling up' of information in the information tree to create a summary of important, recent information is new. There are various search algorithms in prior art that attempt to emulate similar behavior, but without a built in subject taxonomy such algorithms rely on various heuristics to answer a more general set of user queries. For example, in prior art the users may enter arbitrary search terms and the system will evaluate large numbers of potential data entries to obtain a set of possible matches. The current invention gives users far more control by allowing the user to structure their data as they like, assign their own ratings (either by themselves or with friends), and then searches are made for them implicitly allowing them to summarize and 'drill down' to get the information they need. Conversely, ontological systems that assign a strong taxonomy to their data are not used in the area of social networking and have limited interactivity with respect to restructuring and user ratings.

User Interaction in the current invention includes email and SMS alerts, messages, and replies. A user may receive an email update of a change in the system (such as a new posting) and may reply using their email client, rather than logging onto the system. This style of 'round trip' email usage is found in some wiki systems (e.g., Confluence) but not in normal, public social networking systems such as Facebook or MySpace.

Secure Browsing; using SSL or similar encryption to prevent eavesdropping is known in the financial industry, however it is not used in the social networking industry. By making this an option in the present invention, the present invention makes it possible for users to keep their private social life secure from corporate web 'sniffers' and so on.

The present invention effectively utilizes a number of technologies, including, without limitation:

Web Blogs—online 'diaries' written by users

Web Forums—online discussion areas were users post short messages, and (in some instances) 'rate' the value of each others posts Taxonomic classification systems that attempt to categorize web sites in a subject hierarchy X500 style security systems that allow security based on the user, the position of data within a tree of information nodes, and particular attributes of that data Web 'Wikis'—online data bases where users collaborate to write short articles that link to other articles.

Communications security such as SSL where access to web sites is encrypted to prevent eavesdropping by third parties.

'Plug-ins'—users and third parties can create new code modules to extend the functionality of the system.

'Cascading Configuration'—changes in colours, styles, user preferences and security are shared between areas without needing to be redefined.

These technologies are utilized in any combination in the present invention, and give rise to give a number of aspects of invention, such as:

A user editable, hierarchical data tree that can be collaboratively modified and extended over the web;

A hierarchical data tree that is editable in the same manner as a wiki;

A hierarchical data tree where data nodes are textual and link to other hierarchical nodes in the same manner as a wiki;

A hierarchical data tree where data nodes are 'ranked' by users voting on their popularity, classification type, appropriateness for children and so on;

The information resident at the data node is also 'ranked' by users

Customizable 'styles' and 'skins' that may be applied to different levels of the hierarchical data tree, and that propagate down the tree to affect the way that lower nodes are displayed;

Summaries of information that aggregate sub-trees of data, taking into account their ranking, classification type, timeliness, position in the hierarchical data tree, and user viewing preferences;

A hierarchical data system that is easily distributed by placing sub trees of data on different servers;

A sophisticated security architecture easily understandable by average users allowing them to keep on line data strictly private, shared with selected friends or groups, or publicly visible;

Security settings that may be applied to different levels of the hierarchical data tree, and that propagate down the tree to affect the settings of lower nodes;

The ability to access the data over a secure link such as that provided by SSL;

The ability to encrypt the data placed in the system so that only chosen users may read the data, and the unencrypted data is never present on the system;

Status updates on 'watched' sub trees of data, provided by email alerts, RSS feeds and other messaging services;

A 'reputation' system for users that affects how their posts are initially displayed, how much weight is given to their reviews of other posts, and how easily they may create new topic trees in public areas;

A 'cost' system for users who wish to post information, or create new topic trees, in public areas, where the cost depends in part on how high up the hierarchy the new post or topic is;

A system where users register with particular groups of interest in order to be granted privileges over that sub tree, such as status updates, the ability to post new information, and take part in votes affecting that sub tree.

A hierarchical data system where the view of particular types of data may be extended with third-party or user-provided 'plug-ins'.

A hierarchical data system where the structure of nodes in the hierarchy can be arranged by a user, or by a group of users according to an agreement such as a shared vote.

A data system that may alert users to changes via email or sms, and will then accept and categorise responses to those emails or sms-s when the user replies using the same channel, rather than the user going back to the web site.

A data system where access to the system is secured via SSL or a similar security measure to prevent eavesdropping on the data contents of that system.

The invention includes a computer program product comprising a computer usable medium having computer readable program code and computer readable system code embodied on said medium for arranging information associated with a communication system, said computer program product comprising computer readable code within said computer usable medium adapted to perform a method of the invention. The device can be adapted to store information.

The present invention has been found to result in a number of advantages, such as:

Alleviating the wading through large numbers of articles with rapid summarisation of large quantities of data, using the opinion of other readers to discard less useful items—e.g. "most popular sports news in the last 24 hours", "best technical tips for maintaining off road motorcycles".

Alleviating the 'email storm' and 'document overload' for large projects with a collaborative data environment for large groups of people to create high quality, useful information artefacts—e.g. engineering plans, computer software, joint town planning and so on.

Alleviating the difficulty of setting up complex security solutions to maintain privacy for technically unsophisticated users by making complex security technologies available to the average user—e.g. "Sharing baby photos with just my family", "using encrypted web mail over SSL to discuss with a group of colleagues leaving one company to start another".

Alleviating the difficulty of creating an attractive and non-trivial 'web presence' for technically unsophisticated users by providing a structured, extensible web presence with blogs, shared photos, sample themes, calendars and user designated categories—e.g. for teenagers, social clubs, busy workers and others who want the benefit of a useful and attractive web site without having the time or money to invest in web site design.

Alleviating the need for small businesses and organisations to set up multiple, complex programs (or hire multiple services) in order to access email, web hosting, document management, data searching and word processing functions—e.g. a restaurant that wants a home page, a staff email system, and a place for customers to comment on the menu would currently require custom software and an account with an ISP and a web host.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further disclosure, objects, advantages, and aspects of the present application may be better understood by those skilled in the relevant art by reference to the following description of preferred embodiments taken in conjunction with the accompanying drawings, which are given by way of illustration only, and thus are not limitative of the present invention, and in which.

DETAILED DESCRIPTION OF PREFERRED EMBODIMENTS

Figure 1:
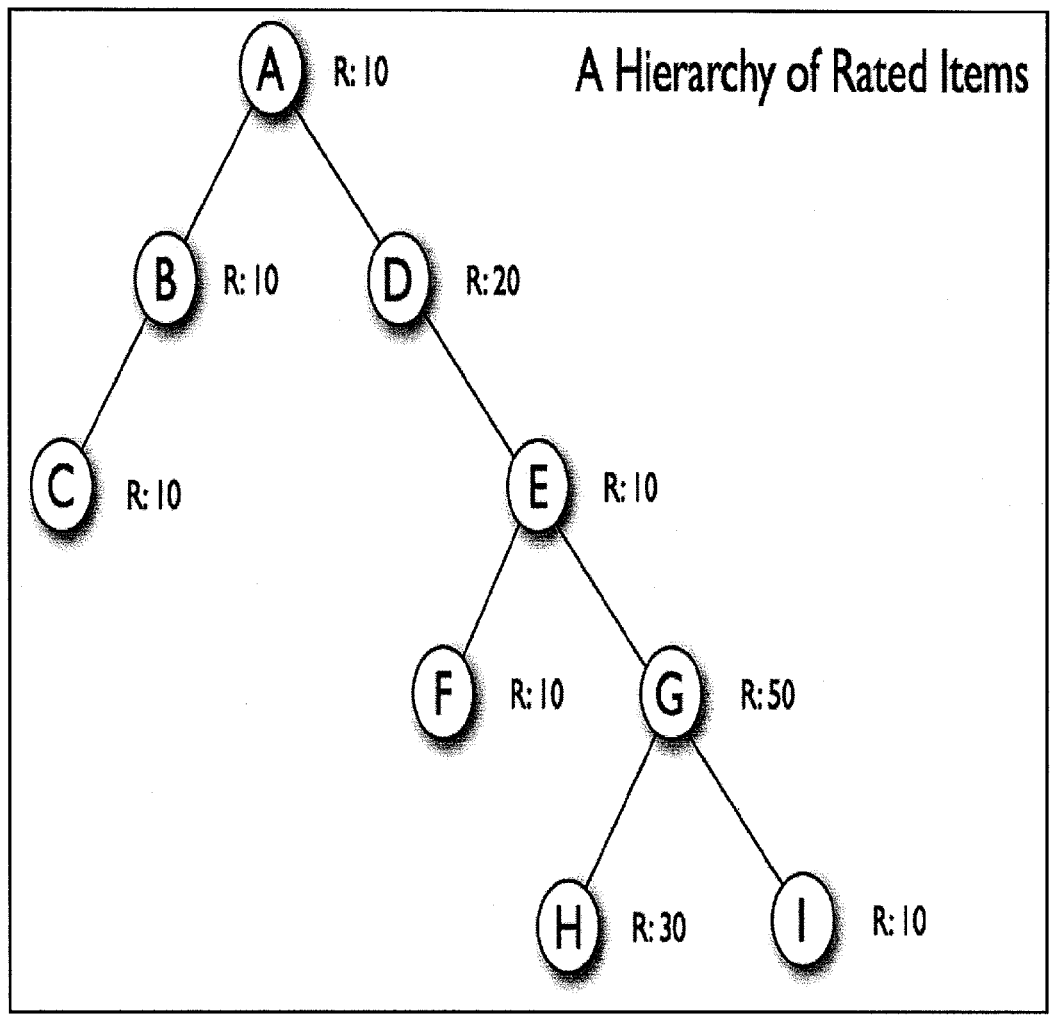
FIG. 1 illustrates an embodiment of the present invention.
Figure 2:
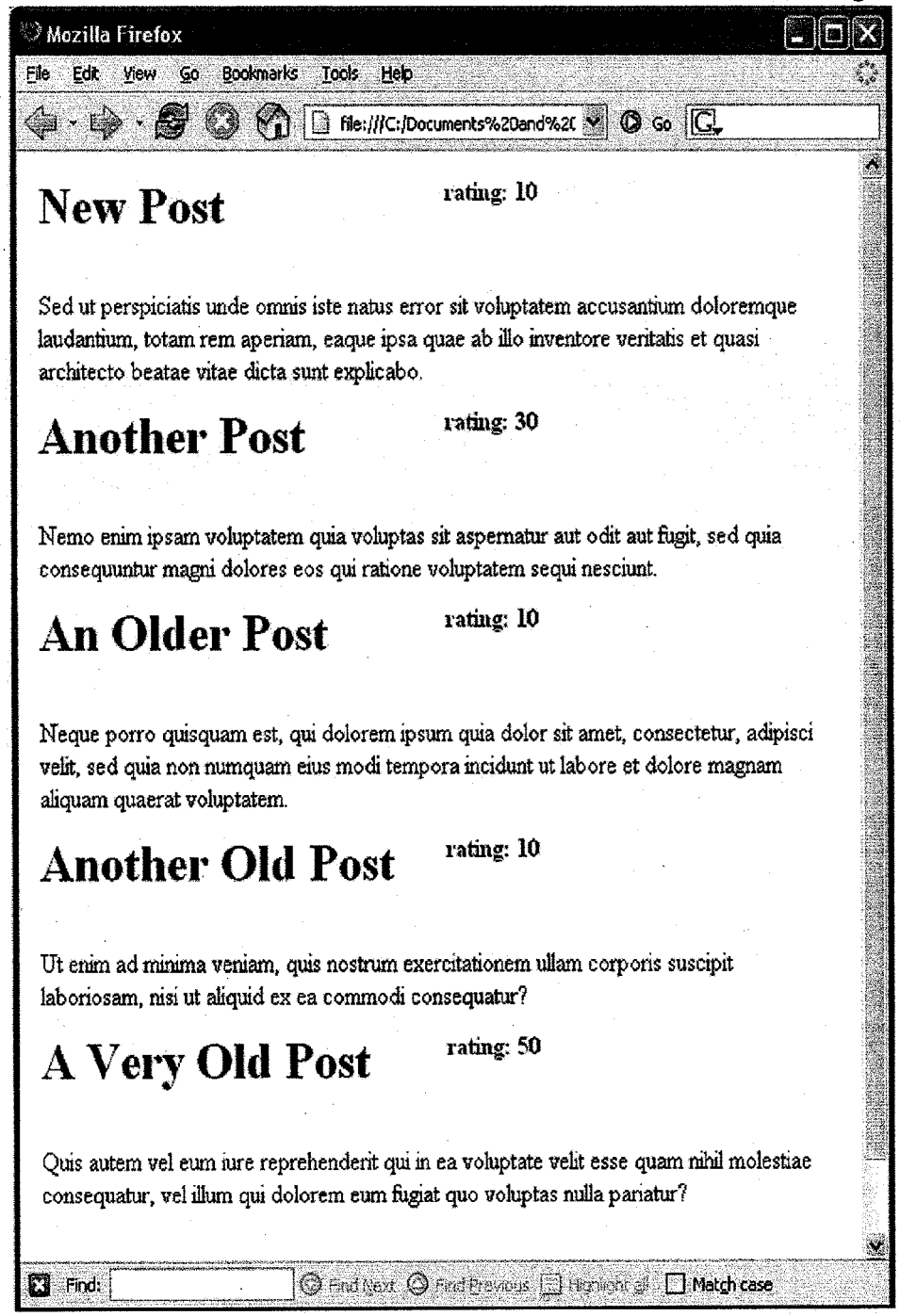
FIGS. 2 to 5 illustrate examples of filtering.
Figure 3:
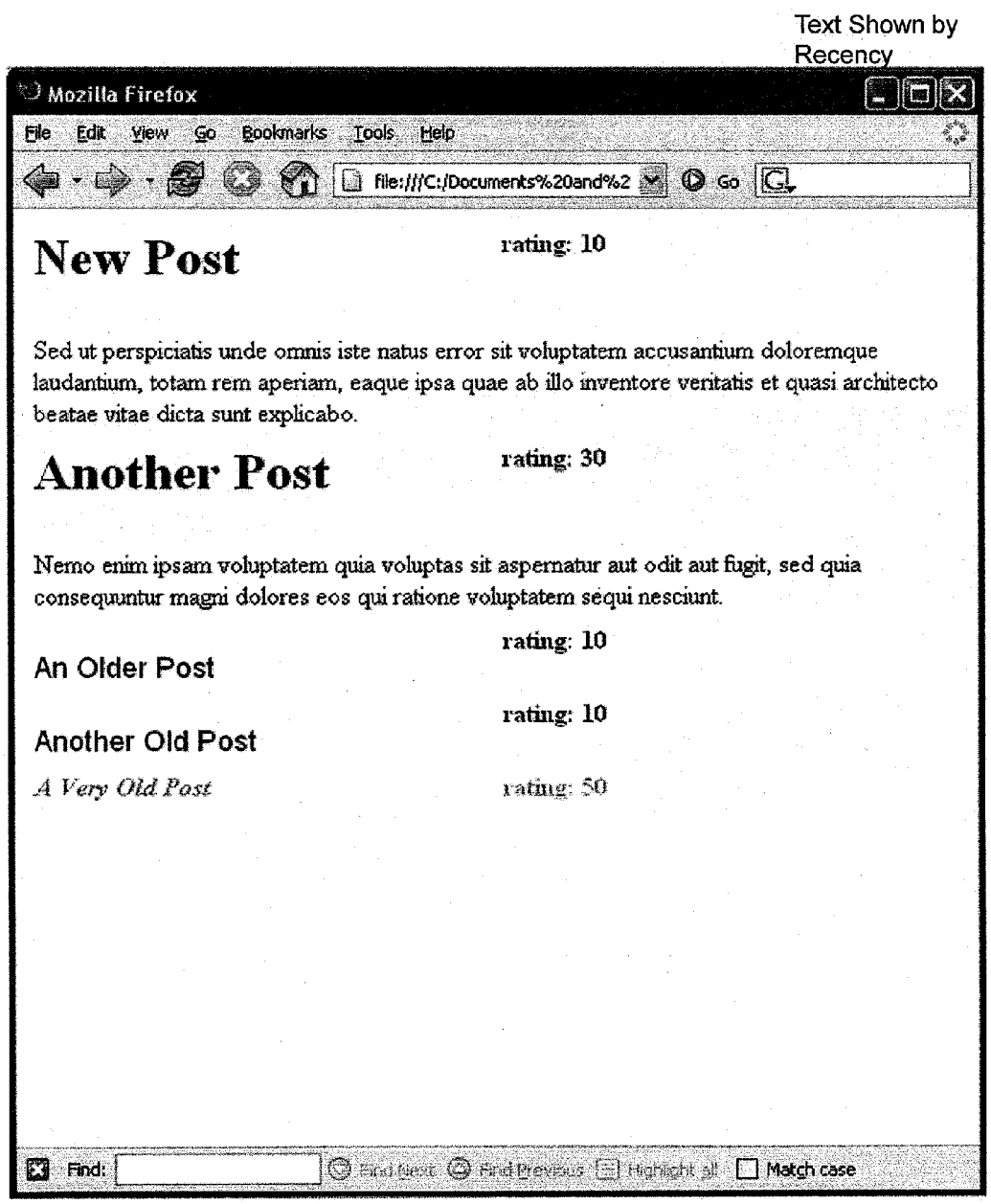
Figure 4:
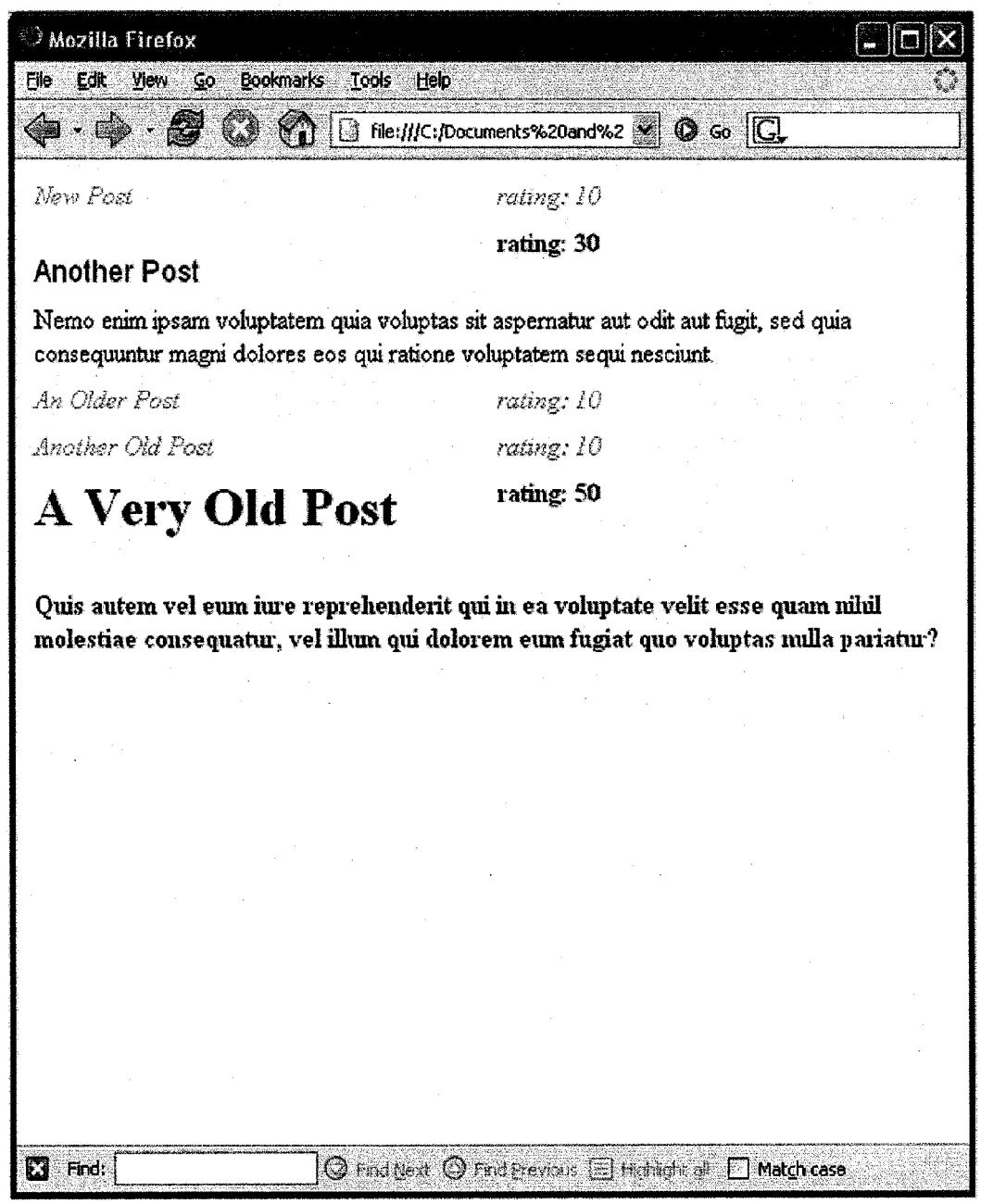
Figure 5:
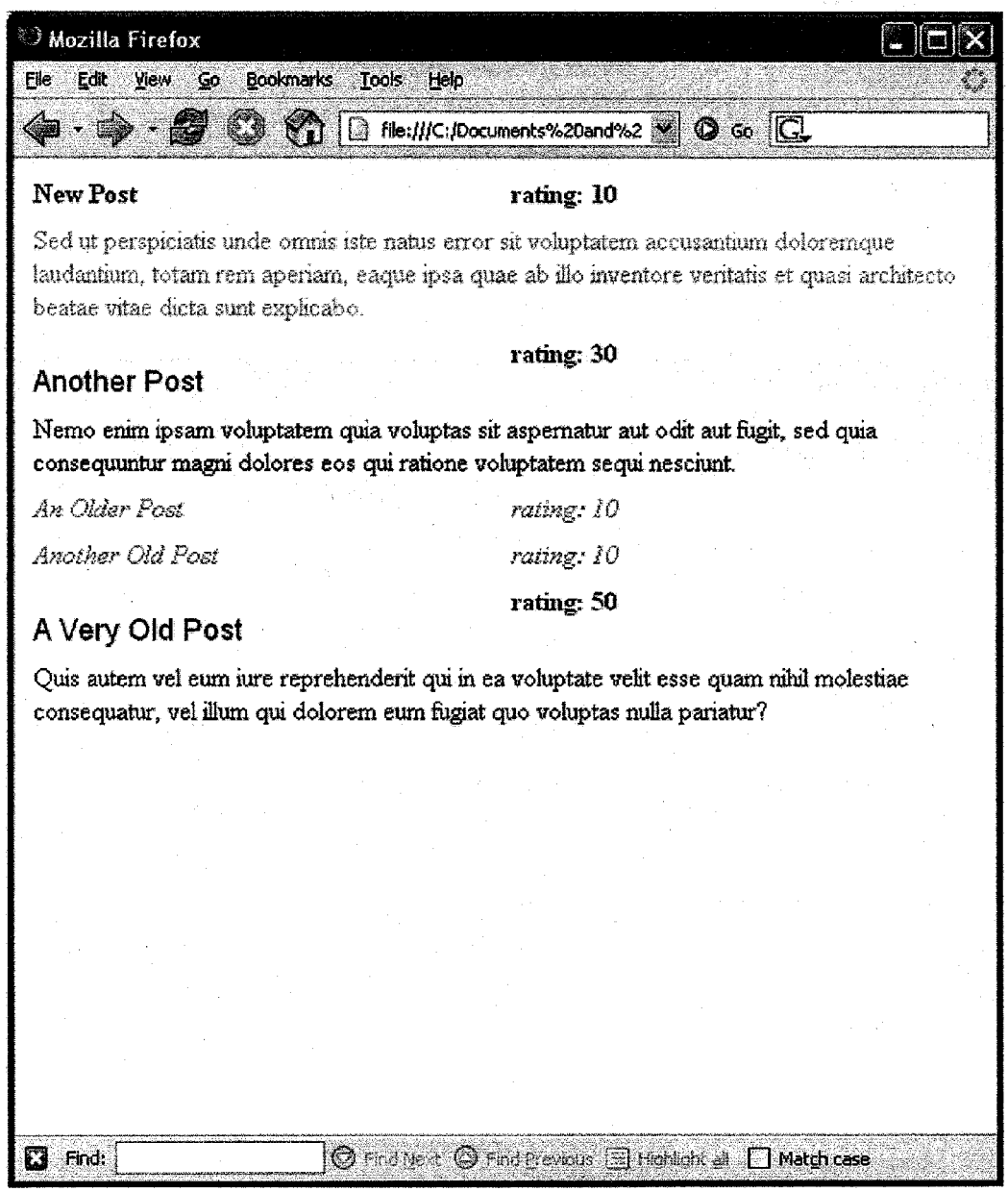

In an embodiment of the present invention, there is provided a communication system which can be manifested as a social networking service. The present invention has a hierarchy of user supplied news, blogs, photos and other information items. These items may be rated by users, and summarized for display, may allow users to filter the items they view. The items a user submits to the present invention may be selectively public, completely private, or restricted to a group of designated users. FIG. 1 illustrates an embodiment of the present invention.

The Item Hierarchy

Traditionally information like emails, web pages, wiki pages, photo galleries, and news items are delivered in a flat manner, possibly with 'subject tags' such as 'personal', 'business', 'sport' and so on, leaving the user to file and sort the information themselves. The present invention encourages its users to post information items in a subject hierarchy of 'topics', and to add new 'topics' as required by using a combination of reputation, user ratings and either emphasizing or minimizing the visibility of postings. FIG. 1 illustrates a representation of this hierarchy. Users adding an inappropriate topic would have the topic either rated poorly, moved, or removed completely, by other users This allows users who are interested only in specific subjects to track those particular topics, and filter out information they don't want to see, and aids in summarising the data with filtered views described below.

User Ratings

A number of web sites allow users to 'rate' user postings, allowing other users to filter out boring posts, spam, or simply to concentrate on only the best postings. The present invention extends this to allow users to use ratings to organize their own private information, and to rate the usefulness of other users information. FIG. 1 also illustrates a representation of this. Ratings for strictly private information are simply assigned by the user. Other ratings are provided by the aggregation of feedback from other users. A 'reputation' system is used to give ratings from some users more credence than others—reputation depends on factors such as the length of time they have been registered with the system, how well their own postings have been received, whether they are a paying customer and other predetermined criteria.

Filtered Views

Using the ratings of items, users may filter their views of sub trees of the item hierarchy. In addition to the ratings, this filtering may combine elements such as the timeliness of the information, and the specificity of the information in the hierarchy, allowing users to generate 'views' such as 'the best of . . . ', or 'today's summary'.

Filtering is done by the user at two levels. FIGS. 2 to 5 illustrate some examples of filtering. Firstly, it is implicit by what the user chooses as 'favorites'—only information from 'favorites' is shown by default, although the user may browse further a field. When viewing a sub tree of data from a particular 'favorite', the user may choose to change the default view to concentrate on timeliness (e.g. showing recent information by preference), rating (e.g. show the highest rated information over all time), or search by other criteria altogether (e.g. concentrate on a particular author, or particular key words). In addition, Users may choose to specifically 'watch' certain subject trees, or to 'hide' other subject trees, thus building a personal profile of interests and dislikes. This information can be used to further filter the information they see, as well as providing an opportunity for personalized service provision such as targeted advertising or customized use of the present invention. Users may choose to display items differentially based on rating, timeliness and so on. For example, older text items might only show a heading, or be greyed out, while newer items are displayed in full.

Security

Users may choose how much visibility the items they submit to the system have. The visibility is preferably chosen when the item is submitted, and is usually implicit in the choice of the information sub tree the item is placed in—so, for example, an entry in a personal diary will remain personal, while a posting in a public forum will be public. While the visibility may be changed for anything at any time, operationally it is more likely that the changes will allow personal information to become public. Some information may be entirely personal (such as a diary entry), shared within a group (such as a word document, or photographs from a party), or completely public (such as a web log). Likewise the ability to edit information may be restricted by the original item provider. Groups of users may be explicitly defined, or based on other criteria (such as explicit subscription to a particular group). Communications security may be provided by SSL to prevent eavesdropping.

Display Algorithms

Using the Filtered Views above, the data may be displayed to the user with visual cues to indicate the importance or otherwise of the information nodes. Nodes which the filtering algorithms wish to emphasize may be displayed in full, or in larger type or stronger colors, while other nodes may be summarized, use a smaller font or be greyed out. Reference can be made to FIGS. 2 to 5 for an example of this.

Email Watches

Figure 6:
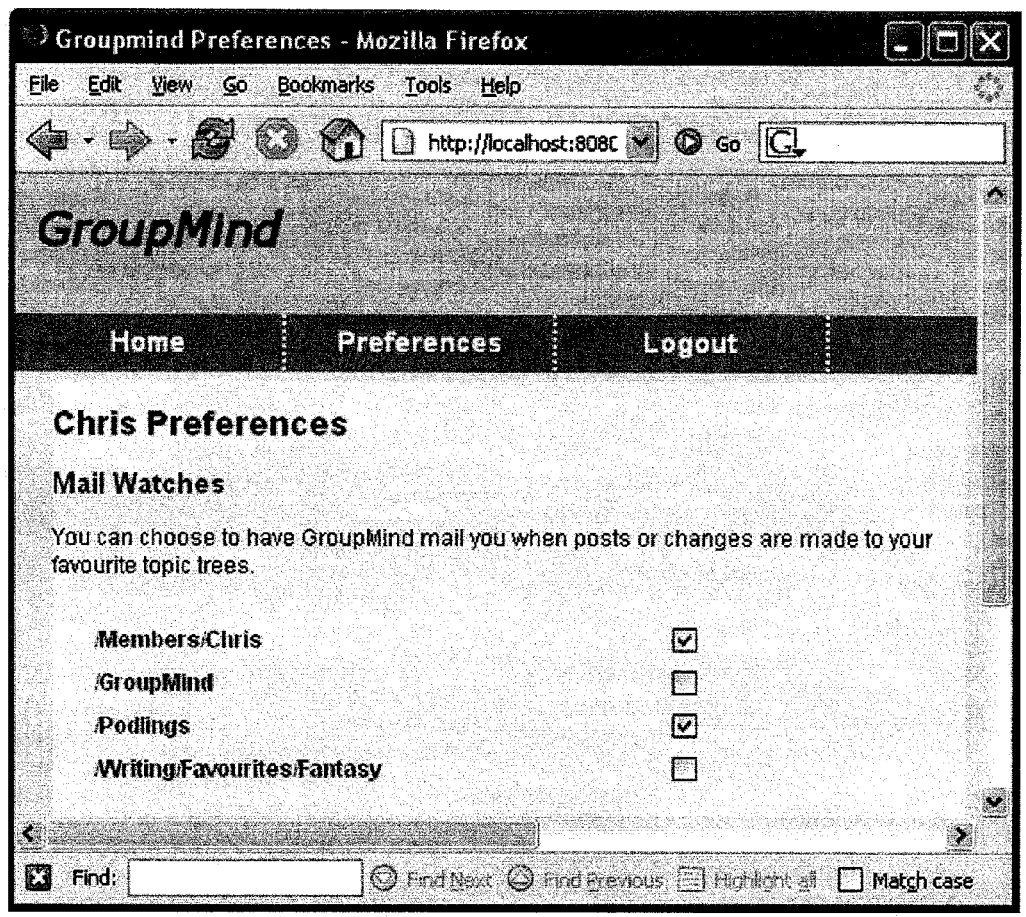
FIG. 6 illustrates a preference page showing user selected mail watches of selected topics.

The system may email a user when an element of the subject tree changes, or may provide a regular summary of changes such as a 'daily wrap up'. FIG. 6 illustrates an example of this.

Commercial Portals

Some nodes may provide a gateway for commercial offerings—the portion of a subject tree corresponding to a geographical location might provide hosting for local businesses, while the portion of a subject tree corresponding to motor vehicles would be appropriate for motor vehicle vendors. For example, consider a subject sub tree:

Australia
| - - - New South Wales
| - - - Victoria
| - - - Ballarat
| - - - Bendigo
| - - - Melbourne In the example above, a Ballarat based business could register themselves at the level of 'Ballarat', giving them easy visibility to people interested in Ballarat, which is a feature not considered possible on the wider web.

Configurable Themes and Styles

Different parts of the subject tree may be displayed in very different ways, although the core information model is identical. Users may personalize their nodes with particular graphics and style sheets, to create a personal 'theme' or 'skin' that changes the way their data is displayed (color, layout, images and so on) without actually changing the raw text on their site. An example of personalized styles is on the internet at MySpace™.

Cascading Themes and Styles

Lower parts of the tree may inherit the themes and styles of their parents, which may then be modified in part and whole. For example a user may add their photo to a generic 'personal blog theme'.

Voting Systems

Users 'watching' a particular subtree may be able to vote either publicly or anonymously on particular issues ranging from abstract proposals to the security visibility of the sub-tree.

Category Tags

In addition to the primary taxonomic subject tree, posts may be tagged with meta-data for searching. Such subject tags may in turn be hierarchical (e.g. "Pets/Dogs/Poodles" for a personal blog entry). For example:

e.g. the Posting:
Journey with My Dog
Yesterday I drove to Sydney with my Poodle. He had a great time hanging out of the window all the way. Here are some pictures.
could be tagged with:
Australia/Sydney, Pets/Dogs/Poodles, "road trips"

Cross-Posting

Some topics and postings may appear in multiple parts of the subject tree, if their topic is capable of being catagorised in multiple areas. For example, a cross border town like "Albury-Wodonga" might be catagorised under both "State of Victoria" and "State of New South Wales", thus allowing it to appear to users browsing or searching in either category. As an implementation detail, this may also be provided by the 'alias' function in an LDAP or X.500 directory.

Data Distribution and Replication

Figure 7:
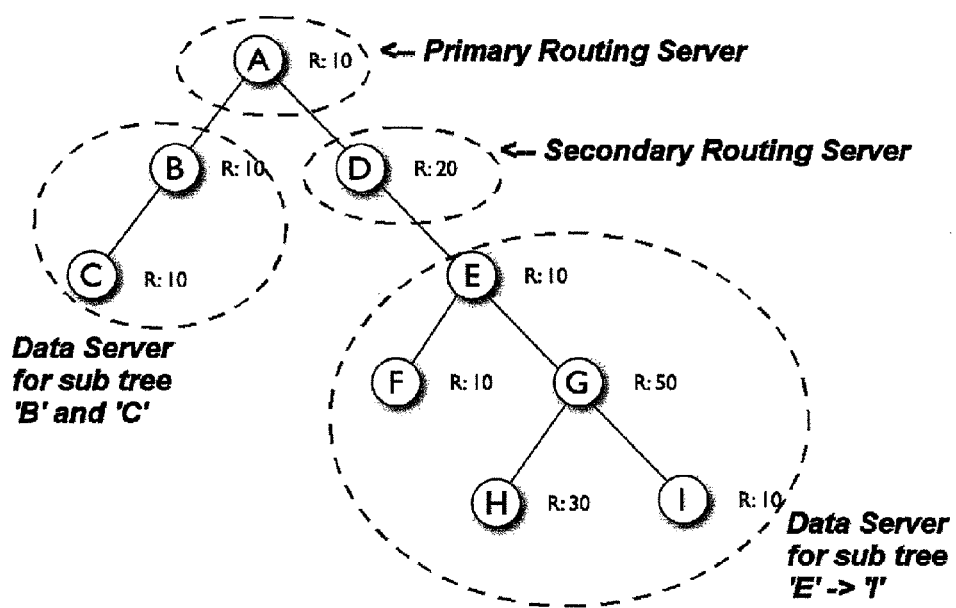
FIG. 7 illustrates an example embodiment used in data distribution and replication.

Off line clients and subsidiary servers may share data between them. Different servers may be responsible for different topic trees, while personal laptops may maintain an occasionally synchronized copy of a user's favorites. This may be implemented in a manner known for LDAP and X500 servers. For example, with reference to FIG. 7, a single tree of topics 'A' to 'I' may be divided among four servers as follows, where a Primary Routing Server is responsible for node 'A', and for forwarding requests to other sub trees on to other servers. Likewise the Secondary Routing server receives requests from the Primary Routing Server, and responds to them (if they are for node 'D'), or passes them on in turn, if they are for the 'E'→'I' Data Server. This allows for servers to be distributed according to load and network requirements (e.g. to put servers for particular topics geographically close to their main user base to reduce network lag).

Threaded Display of Nodes

Text nodes may be displayed in a 'threaded' manner, as is known in the web art. This provides the user with a guide for following the structure of the conversation, by showing which post is responding to which other post.

EXAMPLES

Implementation Examples

The present invention may be implemented in a variety of ways and on a wide variety of computational platforms. Some specific examples, without limitation, are:

As a web site backed a relational data base.

As a web site backed by an LDAP or X500 style directory system.

As a web site backed by a searchable file system (using technology such as Google Search™ or Apple Spotlight™).

An RSS feed backed by any of the above back ends.

A generic web service.

A peer to peer architecture of distributed topic nodes that send queries to each other to provide the appearance of a coherent tree.

Figure 8:
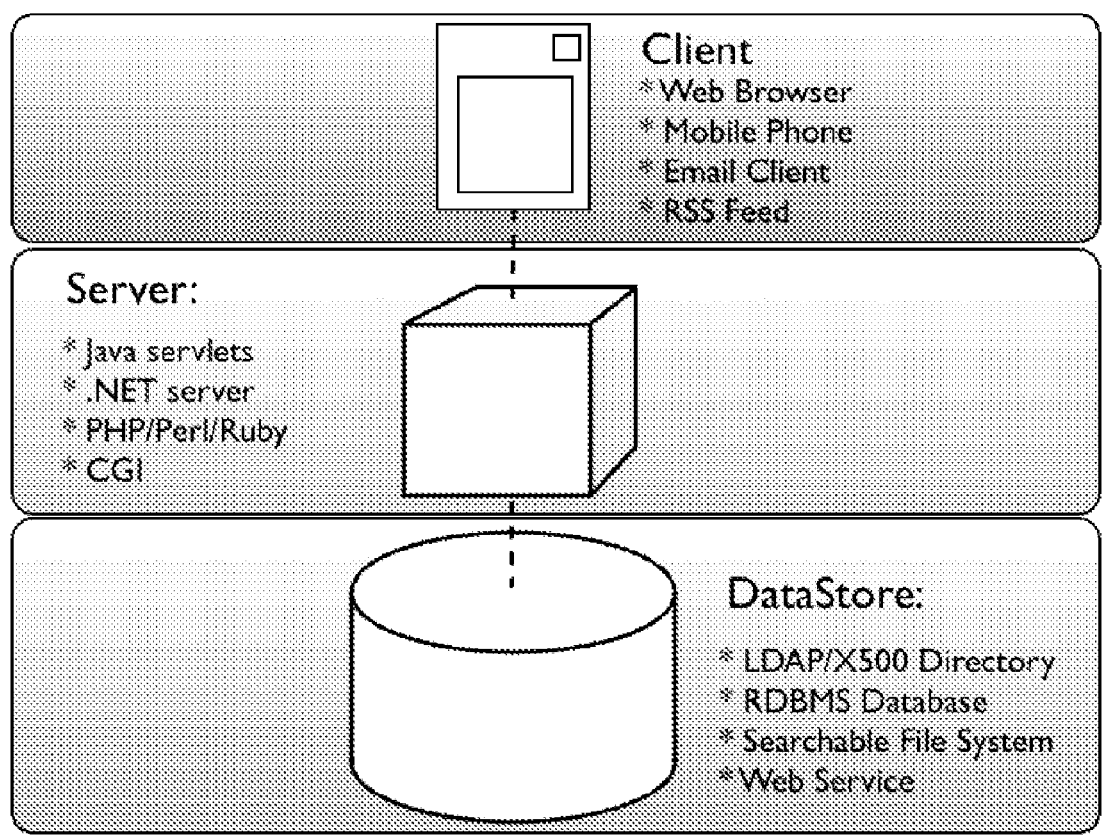
FIG. 8 illustrates an example of a three-tier architecture according to an embodiment of the present invention and includes a number of embodiments of the present invention.

Another example is illustrated in FIG. 8, which shows a 'three tier' architectural implementation of the present invention.

Other architectures are possible, such as the distributed peer to peer mechanism of systems such as bit-torrent.

The listed technologies for each tier are for example purposes only, and are not intended to be exhaustive—there are a wide variety of implementation possibilities all of which provide the end user with the same service.

Turning to FIG. 1 again, it shows a set of nine items formally arranged in a topic tree, and given a rating from 10 to 50. (Usually each topic would have more than one item associated with it, but for simplicity these are not considered). Consider a user viewing topic (E). In this case, items (A)→(D) will not be seen, as they are outside the sub tree defined by (E). If the users choose to view by rating only, the user will see (G) first, with rating '50', followed by (H) with rating '30', followed by (E), (F) and (R) in arbitrary order. If the user chooses to view by date only, and we assume the entries have been entered sequentially (A), (B), (C), (I), the user will see the nodes (E) to (I) in reverse alphabetical order.

The user may also use a custom predefined or user defined view that combines rating, recency, and depth of tree, to provide a summary view. Such an view might start with the rating, add a modifier for recency, and decrease the rating the further away from the watched node the item is.

In a further example, assume the Tree presented previously has the following text postings for nodes (E)→(I)

E: Hobbies→Animals→Pets: Does Anyone know a Good Vet in Melbourne? (rating 10)

I've just moved into Melbourne with a bunch of animals—does anyone know a good vet?

F: Hobbies→Animals→Pets→Cats: Cats are the Greatest (rating 10)

Aren't Cats just the greatest animals ever?

G: Hobbies→Animals→Pets→Dogs: Dog Food Product Recall (rating 50)

I've just found out that Bark-a-lot dog food have recalled their 'Beef Chunks' dog food—something about too much potassium? Anyway here's a link to their web site—http://bark-a-lot.com H: Hobbies→Animals→Pets→Dogs→Poodles: Competition Poodle for Sale (rating 30)

Hi Everyone—I've got a 4 year old Poodle for sale. Here's a list of her competition results from PoodleCon 2006:

Preening: 9/10
Rolling Over: 8/10
Tongue Lolling: 9/10

I: Hobbies→Animals→Pets→Dogs→Pomeranians: Pomeranians Rock! (rating 10)

Pomeranians are the most fantastic Dogs ever! Here's a sixty line poem I've written in their honour!

[ . . . long poem . . . ]

If a user was watching node (G), and the text was displayed in summarised rating mode, the display algorithm would:

Discard nodes (E) and (F) completely—they are above the watched node.
Display G fully—it is highly rated
Display H partially—it is moderately rated
Display I briefly—it is poorly rated.
This might produce the result:
Dog Food Product Recall I've just found out that Bark-a-lot dog food have recalled their 'Beef Chunks' dog food—something about too much potassium? Anyway here's a link to their web site—http://bark-a-lot.com.

Competition Poodle for Sale

Hi Everyone—I've got a 4 year old Poodle for sale. Here's a list of her competition results from PoodleCon 2006:

( . . . link for more text . . . )
Pomeranians Rock!
( . . . link for more text . . . )
Display In order to display a set of nodes, the present invention calculates a 'display rating' (not to be confused with 'user ratings', which are a numeric aggregation of user feedback). This 'display rating' is then used by display technology such as CSS (style sheets) to determine how much prominence to give to a node, and how much of a nodes information to display. Thus highly rated text might be displayed in full, in part, or not at all depending on the rating, while an image might be shown as a thumbnail if it was rated low, or as a larger image if it rated well.

This 'display rating' depends on any one or any combination of:

1. the user rating
2. how recent the information is
3. the position of the information in the user hierarchy
4. the user who posted the information
5. viewer preferences to favor some subjects over others A variety of display options are given to the user using the above information. An example of the options are:

"Flat"—all entries are displayed equally in date order

"Classics"—entries are displayed in rating order, with lower rated items elided

"Recent"—recent entries are displayed in date order, with their prominence set by their user rating "Threaded"—entries are displayed as discussion threads, based on their position in the node tree, with their prominence set by the user rating.

"User Specific"—all entries posted by a specific user are displayed.

Other display options are given based on combinations of the above.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof." Thus, unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

The invention claimed is:

1. A method of arranging information in a communication system, the method comprising:
   using a computing device to provide the information in a hierarchical format, the information being stored at a node in the hierarchy, and the information including summaries that aggregate sub-trees of data, taking into account any of their ranking, classification type, timeliness, position in the hierarchical data tree, and user viewing preferences;
   selectively displaying to a user a first rating for at least a portion of the hierarchical formatted information; and
   the computing device associating the first rating with the information such that a user can observe the rating that is associated with the information,
   wherein a second rating is attributed to the information by a user for his own private information or is assigned as an aggregation of feedback from other users for non-private information, and wherein the user determines the position of the hierarchical node for the information.
2. A method as claimed in claim 1, wherein a separate rating is provided for separate portions of the information.
3. A method as claimed in claim 1, wherein at least one criterium is associated with the arrangement of the hierarchy.
4. A method as claimed in claim 3, wherein the at least one criterium is associated with one or more sub-trees of the hierarchy.
5. A method as claimed in claim 3, wherein the at least one criterium applies to the rating.
6. A method as claimed in claim 5, wherein the criteria is any one or any combination of: styling, date order, thread order, author, tag, security, and user defined attributes.
7. A method as claimed in claim 6, wherein the styling is cascaded down the associated hierarchy and/or sub-tree.
8. A method as claimed in claim 6, wherein the display of the data is made using a user or third-party supplied plug-in.
9. A method as claimed in claim 6, wherein the security is based on groups.
10. A method as claimed in claim 9, wherein the security settings are cascaded down the associated hierarchy and/or sub-tree.
11. A method as claimed in claim 9, wherein a user selectively subscribes to a group.
12. A method as claimed in claim 11, wherein the user is granted privileges over a portion of the hierarchy associated with the group, the privileges comprising, at least any of the ability to post new information, and take part in votes affecting the portion.
13. A method as claimed in claim 1, wherein a filter is applied to provide a view of the arranged information.
14. A method as claimed in claim 13, wherein the filter is applied to at least one sub-tree of the hierarchy.
15. A method as claimed in claim 1, wherein the information is formatted as a wiki.
16. A method as claimed in claim 15, wherein a wiki link are provided to at least a portion of the hierarchy.
17. A method as claimed in claim 1, wherein the rating is based on any or any combination of time, user rating, number of times information is referenced, and/or user designated tags.
18. A method as claimed in claim 1, wherein the information is adapted to be accessed over a secure link.
19. A method as claimed in claim 1, wherein at least a portion of the information is encrypted.
20. A method as claimed in claim 1, further comprising providing an update on portions of the information.
21. A method as claimed in claim 20, wherein the update is provided on selected information.
22. A method as claimed in claim 21, wherein the update is provided by email alert, RSS feed, and/or other messaging services.
23. A method as claimed in claim 1, wherein the rating is biased according to a user's reputation.
24. A method as claimed in claim 1, wherein a second user provides a bias on a first user's rating.
25. A method as claimed in claim 24, wherein the second user's bias is provided according to the second user's reputation.
26. A method as claimed in claim 1, wherein a cost is associated with the location of information in the hierarchy.
27. A method as claimed in claim 1, wherein the information is arranged according to a subject taxonomy.
28. A method as claimed in claim 27, wherein the taxonomy is user definable.
29. A method as claimed in claim 27, wherein advertising is associated with the taxonomy.
30. A method as claimed in claim 27, wherein the taxonomy is geographic.
31. A communication system adapted to arrange information, comprising:
   processor means adapted to operate in accordance with a predetermined instruction set, said system, in conjunction with said instruction set, being adapted to perform the method as claimed in claim 1.
32. A system as claimed in claim 31, having a three tier architecture.
33. A system as claimed in claim 31, wherein the system is distributed.
34. A system as claimed in claim 33, wherein portions of the distributed system are associated with portions of the hierarchy.
35. A computer usable medium having computer readable program code and computer readable system code embodied on said medium for arranging information associated with a communication system, said computer program product comprising computer readable code within said computer usable medium adapted to perform a method as claimed in claim 1.
36. A device adapted to store information, wherein said device comprises the computer usable medium of claim 35.
37. A method as claimed in claim 1, wherein the second rating is the same as the first rating.
38. A method as claimed in claim 1, wherein the user determines to store the information at a different node.

* * * * *